US011952816B2

(12) United States Patent
Hoffmann

(10) Patent No.: US 11,952,816 B2
(45) Date of Patent: Apr. 9, 2024

(54) GUIDE SYSTEM FOR GUIDING A MOVABLY MOUNTED DOOR LEAF

(71) Applicant: Julius Blum GmbH, Hoechst (AT)

(72) Inventor: Benjamin Hoffmann, Dornbirn (AT)

(73) Assignee: Julius Blum GmbH, Hoechst (AT)

( * ) Notice: Subject to any disclaimer, the term of this patent is extended or adjusted under 35 U.S.C. 154(b) by 476 days.

(21) Appl. No.: 17/245,283

(22) Filed: Apr. 30, 2021

(65) Prior Publication Data

US 2021/0246700 A1 Aug. 12, 2021

Related U.S. Application Data

(63) Continuation of application No. PCT/AT2019/060350, filed on Oct. 18, 2019.

(30) Foreign Application Priority Data

Nov. 14, 2018 (AT) .............................. A 50997/2018

(51) Int. Cl.
*E05D 15/00* (2006.01)
*E05D 15/26* (2006.01)
*E05D 15/58* (2006.01)

(52) U.S. Cl.
CPC ........... *E05D 15/264* (2013.01); *E05D 15/58* (2013.01); *E05D 2015/586* (2013.01); *E05Y 2900/212* (2013.01)

(58) Field of Classification Search
CPC ....... E05D 15/264; E05D 15/34; E05D 15/28; E05D 15/30; E05D 15/32; E05D 15/58;
(Continued)

(56) References Cited

U.S. PATENT DOCUMENTS 4,815,797 A 3/1989 Haab et al.
4,872,287 A * 10/1989 Block .................... E05D 13/04
16/87 R (Continued)

FOREIGN PATENT DOCUMENTS

CN 103547757 1/2014
DE 10 2007 022 269 11/2008

(Continued)

OTHER PUBLICATIONS

International Search Report dated Jan. 31, 2020 in International (PCT) Application No. PCT/AT2019/060350.

(Continued)

*Primary Examiner* — Chuck Y Mah
(74) *Attorney, Agent, or Firm* — Wenderoth, Lind & Ponack, L.L.P.

(57) ABSTRACT

A guide system is provided for guiding a door wing, in particular a folding-sliding-door, movably supported relative to a furniture carcass. The guide system includes a guide rail having a longitudinal direction, the longitudinal direction of the guide rail extending substantially parallel to a depth direction of the furniture carcass in a mounted condition on the furniture carcass. A carrier is provided for movably supporting the door wing, and the carrier is displaceably supported at least over a region along the guide rail. An abutment is provided for determining an end position of the carrier in the longitudinal direction of the guide rail, and an adjustment device can adjust a position of the abutment. The abutment can be adjusted by the adjustment device in the longitudinal direction relative to the guide rail.

15 Claims, 6 Drawing Sheets

(58) Field of Classification Search

CPC .... E05D 3/06; E05D 3/08; E05D 3/14; E05D 3/16; E05D 2003/166; E05D 2015/586; E06B 7/36; E06B 7/367; E05Y 2900/20; E05Y 2900/212

See application file for complete search history.

(56) References Cited

U.S. PATENT DOCUMENTS

| | | | | |
|---|---|---|---|---|
| 6,052,867 | A * | 4/2000 | Haab | E05D 15/063 16/99 |
| 6,438,795 | B1 * | 8/2002 | Haab | E05F 5/003 16/86 B |
| 8,240,088 | B2 * | 8/2012 | Tarrega Lloret | E05F 5/003 49/404 |
| 8,402,606 | B1 * | 3/2013 | Tsai | E05F 5/003 16/49 |
| 10,358,856 | B2 * | 7/2019 | Tomlinson | E05F 3/10 |
| 10,508,483 | B2 * | 12/2019 | Dubach | E05F 1/10 |
| 2007/0159037 | A1 * | 7/2007 | Hoffman | E05D 15/58 312/322 |
| 2011/0047885 | A1 | 3/2011 | Chen | |
| 2017/0260789 | A1 | 9/2017 | Gabl | |
| 2018/0155972 | A1 * | 6/2018 | Filges | E05F 3/00 |
| 2019/0284859 | A1 | 9/2019 | Rupp et al. | |
| 2019/0301218 | A1 | 10/2019 | Rupp et al. | |
| 2021/0017800 | A1 * | 1/2021 | Terno | E05F 5/003 |

FOREIGN PATENT DOCUMENTS

| | | | | |
|---|---|---|---|---|
| EP | 0 254 041 | | 1/1988 | |
| EP | 1 813 752 | | 8/2007 | |
| EP | 2 098 669 | | 9/2009 | |
| EP | 2899350 | A1 * | 7/2015 | E05D 13/04 |
| EP | 2 977 534 | | 1/2016 | |
| JP | 58-41893 | | 3/1983 | |
| JP | 2003-74251 | | 3/2003 | |
| JP | 2008-63768 | | 3/2008 | |
| WO | 2018/129572 | | 7/2018 | |
| WO | 2018/129573 | | 7/2018 | |
| WO | 2018/129574 | | 7/2018 | |
| WO | WO-2018129568 | A1 * | 7/2018 | E05D 15/0604 |

OTHER PUBLICATIONS

Search Report dated Mar. 29, 2022 in Chinese Patent Application No. 201980074750.4.

* cited by examiner

GUIDE SYSTEM FOR GUIDING A MOVABLY MOUNTED DOOR LEAF

BACKGROUND OF THE INVENTION

The present invention relates to a guide system for guiding at least one door wing, in particular a folding-sliding-door, movably supported relative to a furniture carcass. The guide system includes at least one guide rail having a longitudinal direction, the longitudinal direction of the guide rail extending substantially parallel to a depth direction of the furniture carcass in a mounted condition on the furniture carcass, a carrier for movably supporting the at least one door wing, the carrier being displaceably supported at least over a region along the guide rail, at least one abutment for determining an end position of the at least one carrier in the longitudinal direction of the guide rail, and at least one adjustment device for adjusting a position of the at least one abutment.

Furthermore, the invention concerns an item of furniture comprising a furniture carcass and at least one door wing, the at least one door wing being movably supported relative to the furniture carcass by a guide system of the type to be described.

EP 0 254 041 A1 discloses a furniture door which is pivotally supported via hinges on a stop bar. The stop bar can be displaced along an upper guide and a lower guide via a scissor mechanism, and the furniture door can be moved in a depth direction of the furniture carcass. The lower guide includes an adjustable abutment, so that the furniture door can be adjusted in a lateral direction when the furniture door is in a closed position.

WO 2018/129572 A1 to the present applicant shows in FIGS. 7*a*-7*d* a guide system for door wings, the guide system comprising two guide rails extending at a right angle to one another. A carrier in the form of a longitudinally extending column is provided for movably supporting at least one door wing. The carrier, jointly with the two door wings, can be displaced in a depth direction of the furniture carcass. Therefore, the door wings, when not in use, can be countersunk in a parallel position to one another into a lateral insertion compartment of the furniture carcass. For this purpose, a guide rail is fixed to the sidewall of the furniture carcass, and the carrier can be displaced along the guide rail in the depth direction of the furniture carcass. However, in the inserted end position of the carrier, it may occur that the door wings, when aligned in a parallel relationship to one another, cannot be arranged flush with the narrow side of the sidewall, due to occurring manufacturing tolerances or due to a different width. As a result, besides a visually disturbing appearance, the movement behavior of the door wings can be negatively affected. Moreover, it is possible that the transition region between the guide rails, due to an inaccurate installation position of the guide rail on the sidewall, does not proceed in a precise manner. As a result, the transfer of a running carriage for guiding the door wings between the guide rails can be impeded.

SUMMARY OF THE INVENTION

It is an object of the present invention to propose a guide system of the type mentioned in the introductory part, thereby avoiding the above-discussed drawbacks.

According to the invention, the abutment can be adjusted by the adjustment device in the longitudinal direction relative to the at least one guide rail.

In other words, the abutment for determining an end position of the carrier can be adjusted in relation to the guide rail extending in the depth direction in the mounted position, so that an end position of the carrier can be adjusted by an actuation of the adjustment device.

Accordingly, by the adjustment device, the door wing to be connected to the carrier can also be positioned in a depth direction of the furniture carcass such that in the mounted condition, a front narrow side of the door wing, in the inserted condition of the door wing, can be arranged flush with a narrow side of the furniture carcass.

The adjustment of the abutment relative to the guide rail can be implemented, for example, in a stepless manner. Alternatively, it is possible that the adjustment device includes a plurality of predetermined positions for the adjustable arrangement of the abutment.

According to an embodiment, the adjustment device has a self-locking configuration. In this way, it can be ensured that a previous adjusted position of the abutment relative to the guide rail will remain in each adjusted position.

The adjustment device can include at least one rotationally supported operating element, and the at least one abutment can be adjusted relative to the guide rail by rotating the operating element.

According to an embodiment, the guide rail includes a front-end portion in the mounted position, and the operating element is arranged on the front-end portion of the guide rail. In other words, the operating element is immediately and directly accessible from the front, that is to say also when the door wing is fully inserted in the depth direction, for a manual or for a tool-assisted adjustment. For example, the operating element can be arranged on a front face of the guide rail in the mounted position. In this way, a simple, intuitive and comfortable adjustment of the abutment relative to the guide rail can be afforded.

The operating element can be rotationally supported about an axis, the axis extending substantially parallel to the longitudinal direction of the guide rail.

The guide rail can include at least one linear guide for displaceably supporting the abutment, and the abutment can be displaced in or along the at least one linear guide by an actuation of the adjustment device.

The guide system can include a transmission mechanism for converting a rotational movement of the operating element into a linear movement of the abutment. The conversion of a rotational movement into a linear movement is a known measure for a person skilled in the art. This can be implemented, for example, by a rack-pinion-arrangement, by a worm gear, or by a threaded spindle/spindle nut arrangement. Moreover, the transmission mechanism offers the possibility to vary the transmission ratio. For example, the operating element can be driven with a cordless screwdriver at a relatively high rotational speed, and the abutment can be driven with a small hub, but with a large force.

The transmission mechanism can include, for example, a coupling rod connected to the at least one abutment, and the coupling rod can be moved relative to the guide rail by an actuation of the adjustment device. The guide rail can include at least one guide channel for receiving the coupling rod, whereby the coupling rod can be arranged on the guide rail in a visually unobtrusive manner and safely from a possible engagement of fingers or objects. The coupling rod can be configured either as a thrust lever or as a threaded spindle.

According to an embodiment, the at least one abutment is formed or arranged on an ejector of an ejection device. By the ejection device, the carrier can be ejected in a direction opposite the depth direction by overpressing the abutment into an overpressing position arranged behind the end position. Preferably, an entirety of the ejection device can be adjusted relative to the guide rail by the adjustment device.

BRIEF DESCRIPTION OF THE DRAWINGS

Further details and advantages of the invention result from the following description of figures, in which.

DETAILED DESCRIPTION OF THE INVENTION

Figure 1A:
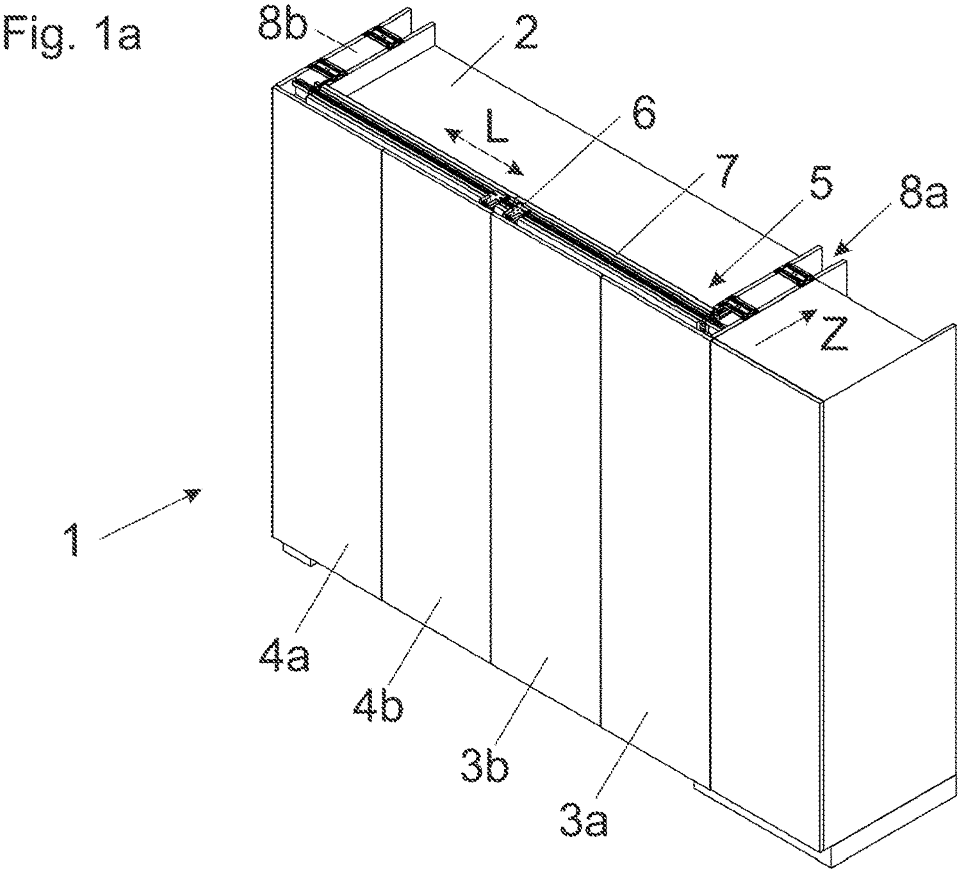
FIG. 1*a*, 1*b* is a perspective view of an item of furniture and furniture parts movable thereto.

FIG. 1*a* shows a perspective view of an item of furniture 1 comprising a furniture carcass 2 and a folding-sliding-door having movable door wings 3*a*, 3*b*; 4*a*, 4*b*. The door wings 3*a*, 3*b* are movably supported by a guide system 5 between a first position, in which the door wings 3*a*, 3*b*; 4*a*, 4*b* are aligned coplanar to one another, and a second position, in which the door wings 3*a*, 3*b*; 4*a*, 4*b* are aligned parallel to one another. The door wings 3*a*, 3*b*, in a second (parallel) position, can be inserted into a lateral receiving compartment 8*a* of the furniture carcass 2. The door wings 4*a*, 4*b*, in a parallel position to one another, can be inserted into a further receiving compartment 8*b*. The functionality will be explained in the following with the aid of the door wings 3*a*, 3*b*, and the same explanations apply for the door wings 4*a*, 4*b*. The guide system 5 includes a longitudinal rail 7 having a longitudinal direction (L), and a running carriage 6 configured to be coupled to the second door wing 3*b* is displaceably supported along the longitudinal rail 7. In a mounted position, the longitudinal rail 7 is arranged substantially horizontally and parallel to a front edge of the furniture carcass 2.

Figure 1B:
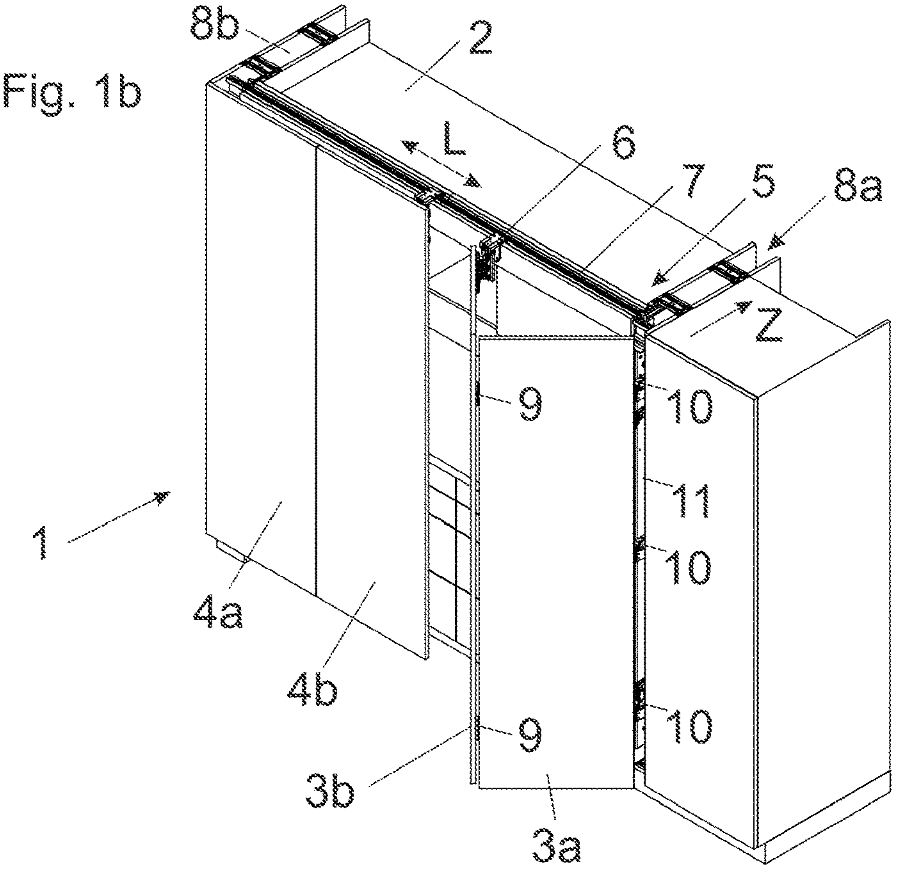

FIG. 1*b* shows the item of furniture 1, and the door wings 3*a*, 3*b* have been moved from the coplanar position shown in FIG. 1*a* into an angled position to one another. The first door wing 3*a* can be movably supported on a carrier 11, for example by two or more furniture hinges 10. The carrier 11 can be inserted in a depth direction (Z) into the receiving compartment 8*a*. In the shown figure, the carrier 11 is located in a transfer position, so that the running carriage 6 can be transferred between the longitudinal rail 7 and the carrier 11. In the shown transfer position, the carrier 11 is releasably locked to the longitudinal rail 7, and the locking between the longitudinal rail 7 and the carrier 11 can be released by an entry of the running carrier 6 in or onto the carrier 11. The carrier 11 is in the form of a longitudinally extending column, a length of the column corresponding to at least half of a height of the door wings 3*a*, 3*b*. The two door wings 3*a*, 3*b* are pivotally connected to one another about a vertically extending axis by at least one hinge fitting 9. The second door wing 3*b* is displaceably supported along the longitudinal rail 7 via the running carriage 6.

Figure 2A:
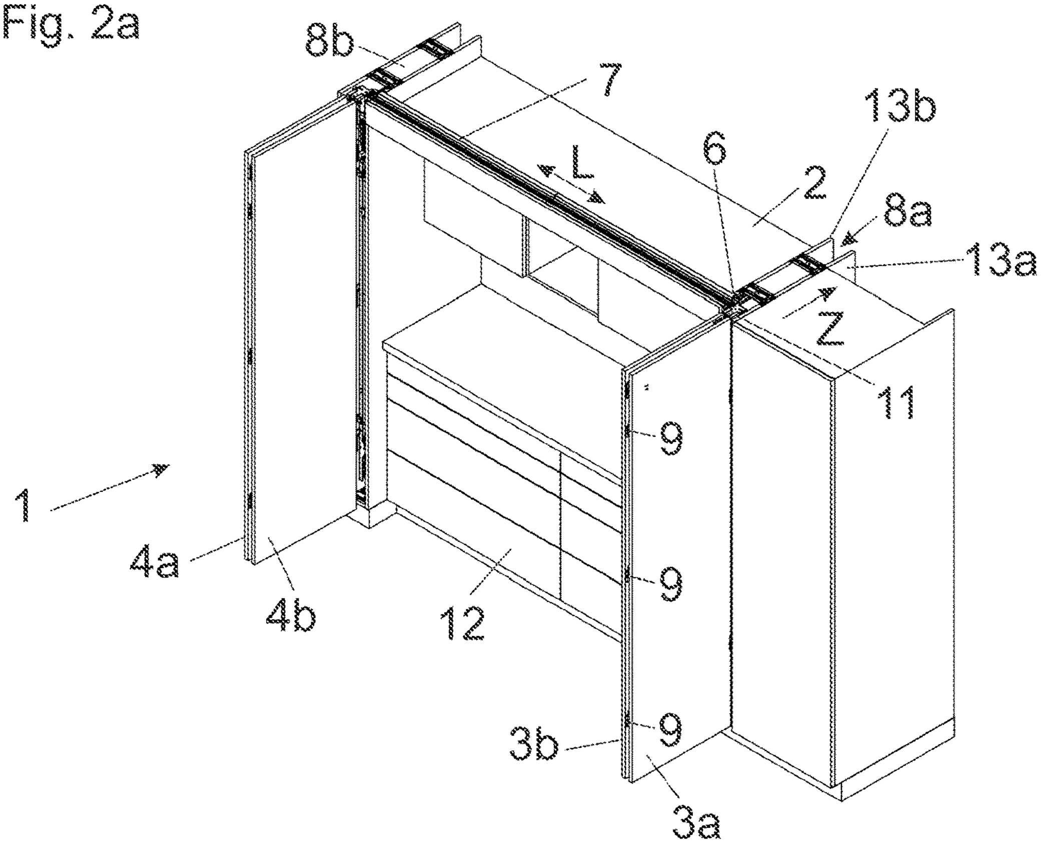
FIG. 2*a*, 2*b* show the item of furniture according to FIGS. 1*a*, 1 *b* in further positions of the furniture parts to one another.

FIG. 2*a* shows the item of furniture 1 with the door wings 3*a*, 3*b* which are now aligned parallel to one another. The carrier 11 has been unlocked from the longitudinal rail 7 by an entry of the running carriage 6, so that the carrier 11 (jointly with the running carriage 6 and the door wings 3*a*, 3*b*) can be inserted in the depth direction (Z) along a guide rail 17 (FIG. 3) of the guide system 5 into the receiving compartment 8*a*, the guide rail 17 extending transversely to the longitudinal direction (L) of the longitudinal rail 7.

Figure 2B:
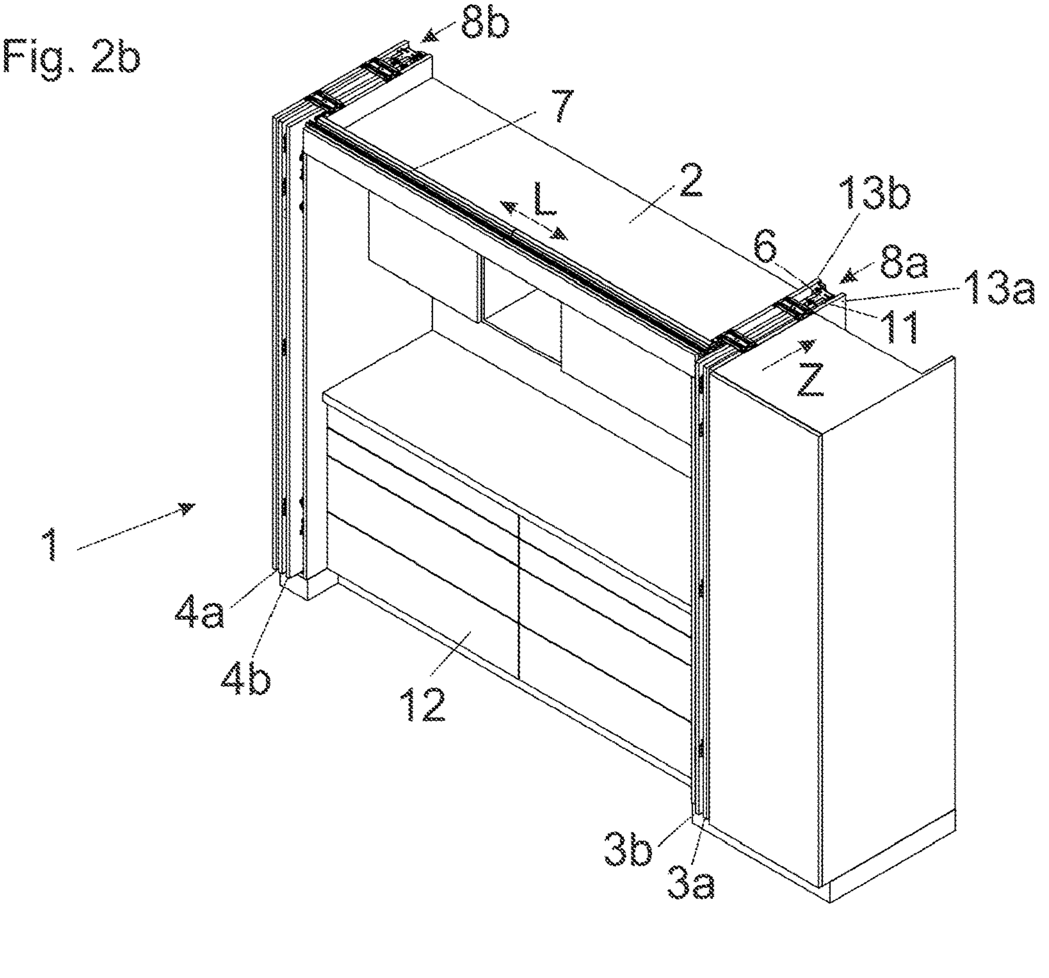

FIG. 2*b* shows the item of furniture 1 with the door wings 3*a*, 3*b* which are now located in a fully inserted condition within the receiving compartment 8*a*. The door wings 3*a*, 3*b* are thus movably supported by the guide system 5 between a first position according to FIG. 1*a*, in which the door wings 3*a*, 3*b* are aligned substantially coplanar to one another, and a second position according to FIG. 2*b*, in which the door wings 3*a*, 3*b* are aligned substantially parallel to one another and in which the door wings 3*a*, 3*b* can be accommodated within the receiving compartment 8*a*. In this way, for example, a kitchen 12 as shown in FIG. 2*a*, 2*b* can be entirely covered, so that the kitchen 12 can be visually separated from a remaining area of a living room. In the shown embodiment, the receiving compartment 8*a* is formed by a sidewall 13*a* and by a stationary furniture part 13*b* spaced from the sidewall 13*a* in a parallel relationship. The door wings 3*a*, 3*b*, in a parallel position to one another, can be inserted between the sidewall 13*a* and the stationary furniture part 13*b*.

Figure 3:
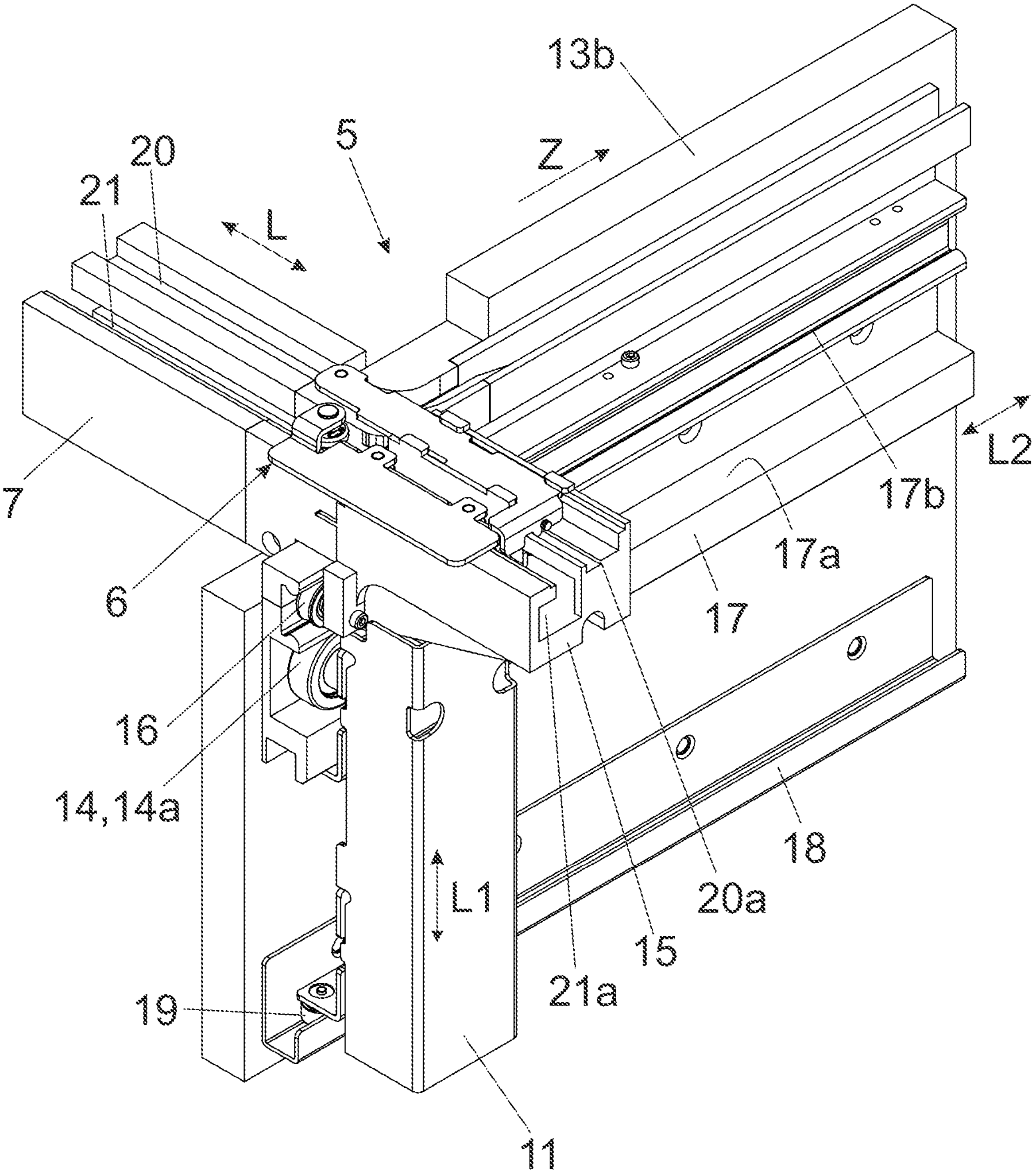
FIG. 3 shows the guide system in a perspective view.

FIG. 3 shows a perspective view of the guide system 5 in a region between the sidewall 13*a* and the stationary furniture part 13*b*, between which the receiving compartment 8*a* for receiving the door wings 3*a*, 3*b* is formed. The longitudinal rail 7 has a longitudinal direction (L) extending parallel to a front edge of the furniture carcass 2 in a mounted position. A guide rail 17 having a longitudinal direction (L2) is arranged on the stationary furniture part 13*b*. The longitudinal direction (L) of the longitudinal rail 7 and the longitudinal direction (L2) of the guide rail 17 extend transversely, preferably substantially at a right angle, to one another. The carrier 11 is configured for movably supporting the at least one door wing 3*a*. In a mounted condition, the door wing 3*a* is pivotally supported, for example by two or more hinges (FIG. 1*b*), on the carrier 11 about a vertically extending axis in the mounted position. The carrier 11 includes at least one guiding device 14 for moving the carrier 11 along the guide rail 17 in the depth direction (Z) and in a direction opposite the depth direction (Z). In the shown figure, the guiding device 14 of the carrier 11 includes at least one running wheel 14*a* movably supported along a first running limb 17*a* of the guide rail 17.

In the shown embodiment, the carrier 11 can be releasably locked to the longitudinal rail 7 via a receiving device 15. The receiving device 15 is configured so as to receive the running carriage 6, so that the running carriage 6 can be moved from the longitudinal rail 7 into the receiving device 15. For this purpose, guide grooves 20, 21 may be arranged in the longitudinal rail 7. The guide grooves 20, 21 extend in the longitudinal direction (L) of the longitudinal rail 7 and are aligned flush with corresponding guide grooves 20*a*, 21*a* of the receiving device 15 when the receiving device 15 is in the transfer position. In this way, the running wheels of the running carriage 6 can be displaced between the longitudinal rail 7 and the receiving device 15 without a disturbing abutting edge.

For the improved decoupling between the receiving device 15 and the carrier 11, it can be provided that the receiving device 15 includes at least one supporting roller 16 separate from the guiding device 14 of the carrier 11, the at least one supporting roller 16 being movable along the guide rail 17. It can be preferably provided that the guide rail 17 includes a first running limb 17*a* and at least one second running limb 17*b* separate from the first running limb 17*a*. The running wheel 14*a* of the guiding device 14 is movably supported along the first running limb 17*a* of the guide rail 17, and the at least one supporting roller 16 of the receiving device 15 is movably supported along the second running limb 17*b* of the guide rail 17.

The carrier 11 and the receiving device 15 are connected to one another in a movement-coupled manner upon a movement along the guide rail 17 in the depth direction (Z). It is preferably provided that the receiving device 15 and the carrier 11, upon a movement along the guide rail 17 in the depth direction (Z) and in a direction opposite the depth direction (Z), are coupled to one another without clearance. For the improved support of the carrier 11, at least one further guide rail 18 may be provided, and a further running wheel 19 of the carrier 11 is displaceably supported along the further guide rail 18.

Figure 4:
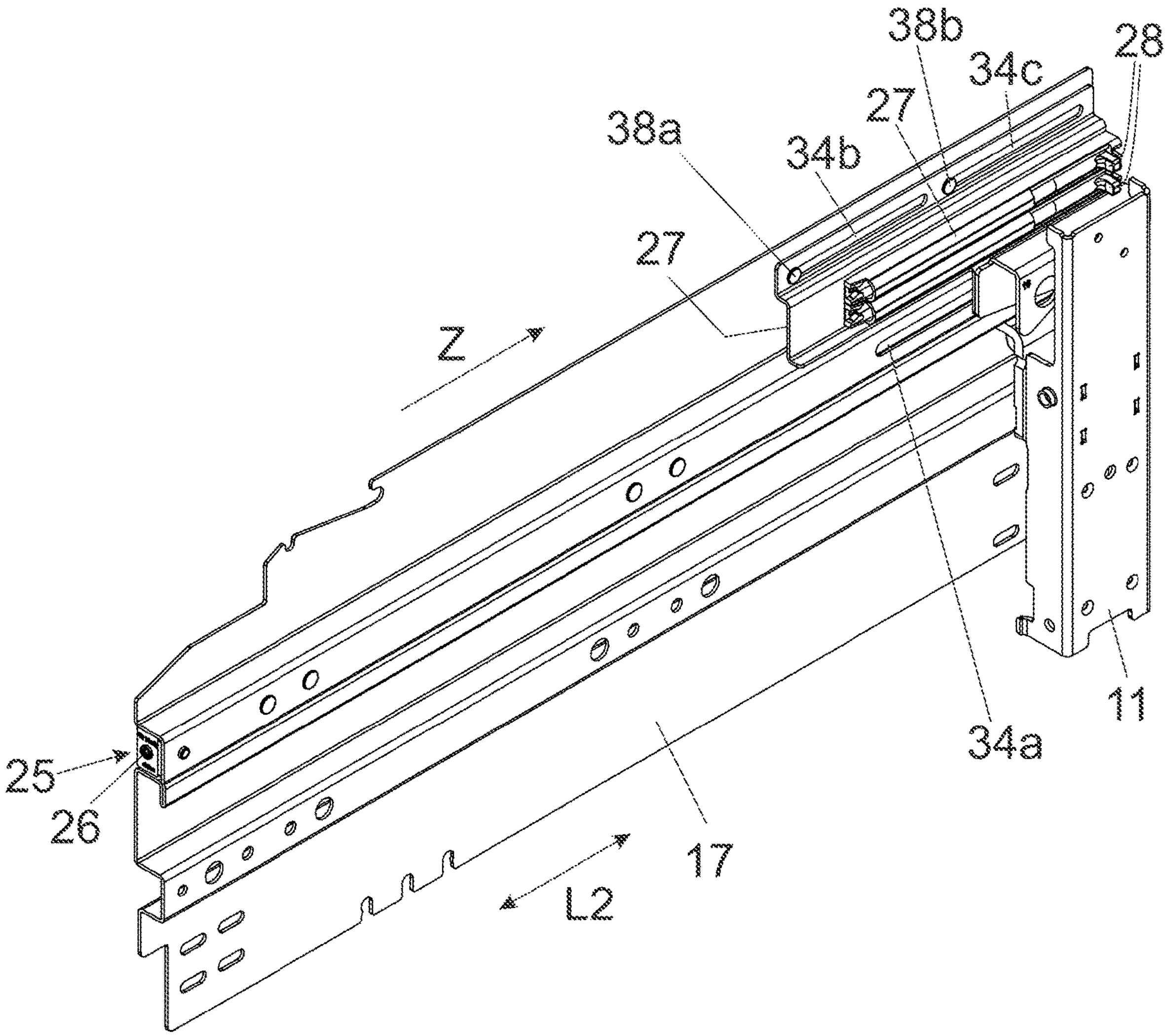
FIG. 4 shows the guide rail configured to be arranged on the furniture carcass in a perspective view.

FIG. 4 shows a perspective view of the guide rail 17 configured to be arranged on the stationary furniture part 13*b* and to be arranged in the depth direction (Z) of the furniture carcass 2. An adjustment device 25 is arranged on the front end-face of the guide rail 17, the adjustment device 25 having a rotationally supported operating element 26. By rotating of the operating element 26 with the aid of a tool, at least one abutment 28 for determining an end position of the carrier 11 relative to the guide rail 17 can be adjusted. In the shown embodiment, the abutment 28 is formed or arranged on an ejector 36 of an ejection device 27. By overpressing the abutment 28 into an overpressing position arranged behind the end position, the carrier 11 can be ejected in a direction opposite the depth direction (Z) by a force of the ejection device 27.

Figure 5:
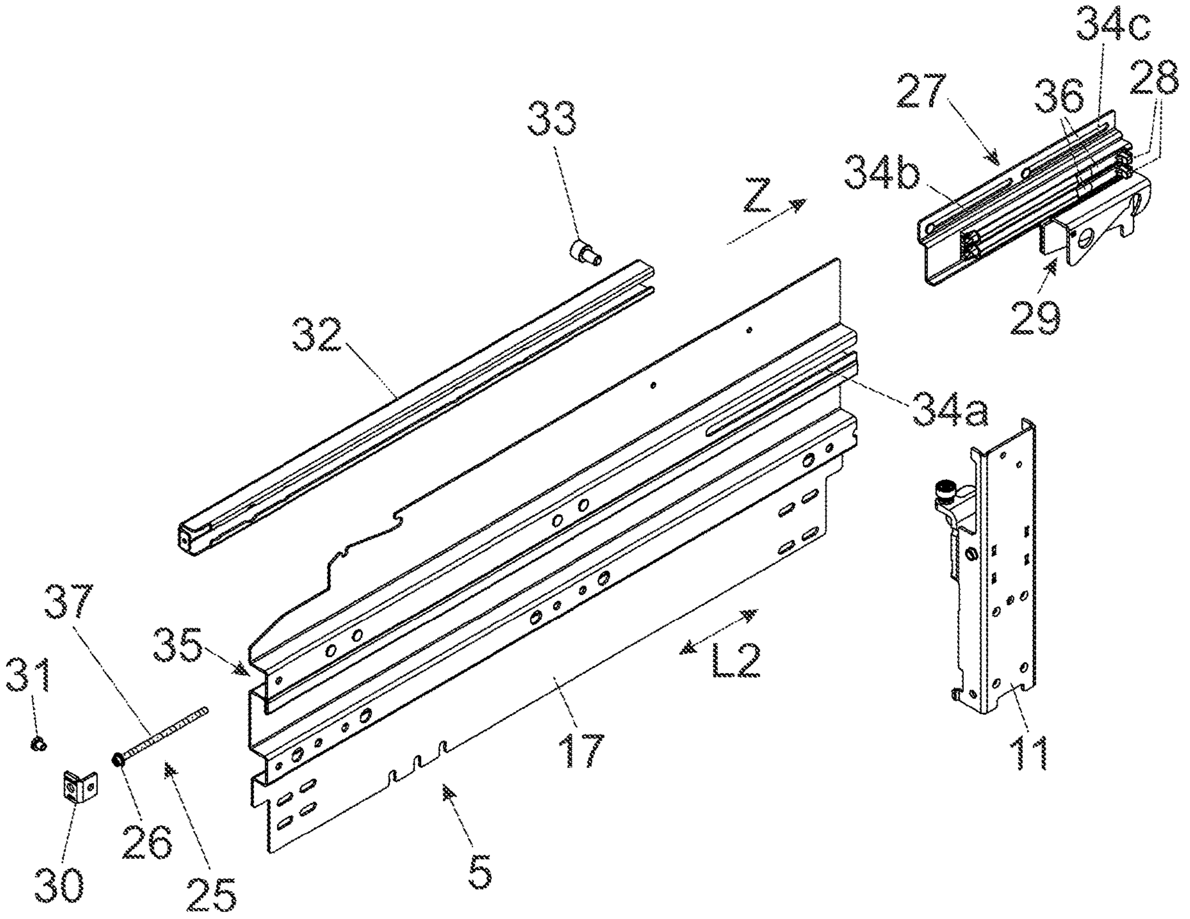
FIG. 5 shows the guide system in an exploded view.

FIG. 5 shows the guide system 5 in an exploded view. The guide rail 17 has a longitudinal direction (L2), and the at least one abutment 28 is displaceably supported in the longitudinal direction (L2) by an actuation of the adjustment device 25. The operating element 26 is arranged on the front-end of the guide rail 17, the operating element 26 being rotationally arranged on a bearing portion 30, but arranged non-displaceably in the longitudinal direction (L2). For this purpose, the operating element 26 can have an undercut (for example in the form of a recess) in which the bearing portion 30 can be received in a form-locking manner. The bearing portion 30 is configured to be fixed to the front-end region of the guide rail 17 by a first screw 31. The operating element 26 is in threading engagement with a coupling rod 32 via a threaded portion 37, and the coupling rod 32 can be moved in the longitudinal direction (L2) by an actuation of the operating element 26. The coupling rod 32 is connected to the ejection device by a second screw 33, the ejection device 27 being configured to be displaceable in or along at least one linear guide 34*a* of the guide rail 17. By the ejection device 27, the carrier 11 can be ejected in a direction opposite the depth direction (Z).

In the shown embodiment, two abutments 28 are provided, and each of the abutments 28 is formed or arranged on an ejector 36 of the ejection device 27. Each of the ejectors 36, in a usual manner, includes a lockable force storage member configured to be unlocked by a movement of the abutments 28 into an overpressing position arranged behind the end position. The ejection device 27 further includes an insertion slit 29 for a portion of the carrier 11, so that the position of the carrier 11 can be stabilized in the end position in a direction extending transversely to the longitudinal direction (L2). By applying a force to the furniture parts 3*a*, 3*b* in the end position of the carrier 11, the receiving device 15 of the carrier 11 can contact the abutments 28 so as to move them into the overpressing position, so that the force storage members of the ejectors 36 can be unlocked, and the carrier 11 can be ejected in a direction opposite the depth direction (Z) by a force of these force storage members.

Figure 6A:
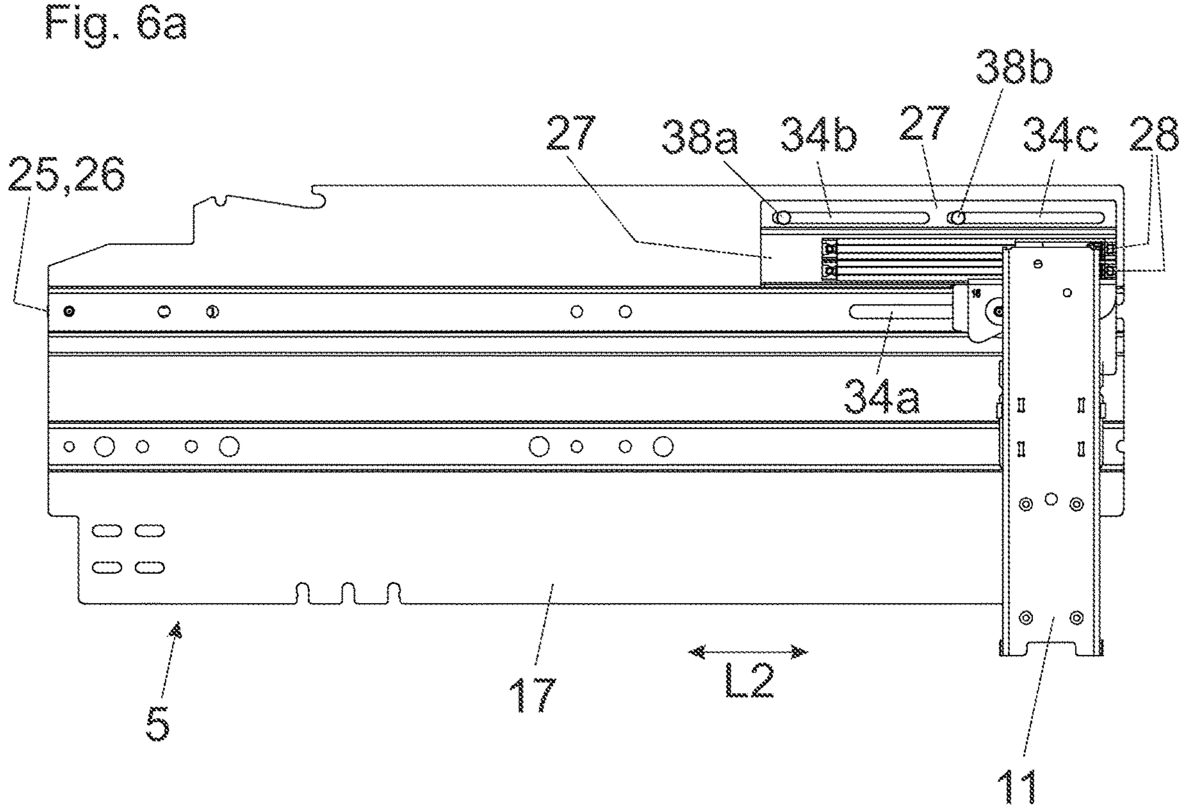
FIG. 6*a*, 6*b* are side views of the guide system with two different end positions of the carrier relative to the guide rail.

FIG. 6*a* shows the guide system 5 in a side view, in which the carrier 11 adopts a first end position relative to the guide rail 17. By the adjustment device 25, the at least one abutment 28 can be adjusted in the longitudinal direction (L2) of the guide rail 17. For displaceably supporting the abutment 28 and/or the ejection device 27, at least one or a plurality of linear guides 34*a*, 34*b*, 34*c* can be provided. The linear guide 34*a* is formed on the guide rail 17, whereas the two other linear guides 34*b*, 34*c* are arranged on the ejection device 27. By an actuation of the adjustment device 25, the linear guides 34*b*, 34*c* can be displaced relative to pins 38*a*, 38*b* which are stationarily arranged relative to the guide rail 17.

Figure 6B:
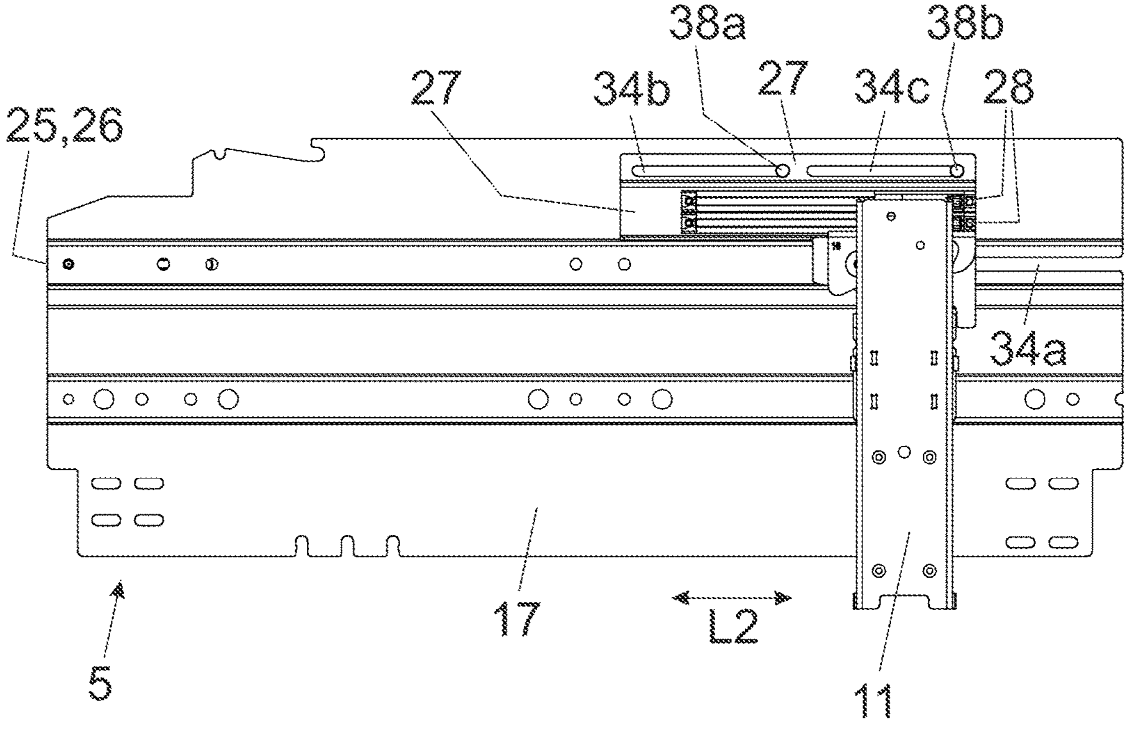

FIG. 6*b* shows the guide system 5 with the carrier 11 in a second end position, the second end position deviating from the first end position. By adjusting the abutment 28 for determining an end position of the carrier 11, manufacturing tolerances of the door wings 3*a*, 3*b* or a different width of the door wings 3*a*, 3*b* can be compensated for. Therefore, a front-end face of the door wings 3*a*, 3*b*, in the inserted condition within the receiving compartment 8*a* of the furniture carcass 2, can be aligned flush relative to the front end faces of the sidewall 13*a* and of the stationary furniture part 13*a*. According to an embodiment, it can be provided that the at least one abutment 28 can be adjusted by the adjustment device 25 between 0 mm and 50 mm, preferably between 0 mm and 130 mm.

The invention claimed is:

1. A guide system for guiding a door wing movably supported relative to a furniture carcass, the guide system comprising:

a guide rail having a longitudinal direction to extend substantially parallel to a depth direction of the furniture carcass in a mounted condition on the furniture carcass, a carrier for movably supporting the door wing, the carrier being displaceably supported along the guide rail, an abutment configured to determine an end position of the carrier in the longitudinal direction of the guide rail, and an adjustment device for adjusting a position of the abutment along the longitudinal direction relative to the guide rail, wherein the adjustment device includes a rotationally supported operating element, and the abutment is adjustable relative to the guide rail by a rotation of the operating element, and wherein the guide rail includes a front-end portion in a mounted position, and the operating element is arranged on the front-end portion of the guide rail.

2. The guide system according to claim 1, wherein the adjustment device is a self-locking adjustment device.

3. The guide system according to claim 1, wherein the operating element is mounted so as to be stationary in the longitudinal direction of the guide rail upon a rotation of the operating element.

4. The guide system according to claim 1, further comprising a linear guide for displaceably supporting the abutment on the guide rail.

5. A guide system for guiding a door wing movably supported relative to a furniture carcass, the guide system comprising:

a guide rail having a longitudinal direction to extend substantially parallel to a depth direction of the furniture carcass in a mounted condition on the furniture carcass, a carrier for movably supporting the door wing, the carrier being displaceably supported along the guide rail, an abutment configured to determine an end position of the carrier in the longitudinal direction of the guide rail, and an adjustment device for adjusting a position of the abutment along the longitudinal direction relative to the guide rail, wherein the adjustment device includes a rotationally supported operating element, and the abutment is adjustable relative to the guide rail by a rotation of the operating element, and wherein the operating element is arranged on a front-end face of the guide rail in a mounted position.

6. A guide system for guiding a door wing movably supported relative to a furniture carcass, the guide system comprising:

a guide rail having a longitudinal direction to extend substantially parallel to a depth direction of the furniture carcass in a mounted condition on the furniture carcass, a carrier for movably supporting the door wing, the carrier being displaceably supported along the guide rail, an abutment configured to determine an end position of the carrier in the longitudinal direction of the guide rail, and an adjustment device for adjusting a position of the abutment along the longitudinal direction relative to the guide rail, wherein the adjustment device includes a rotationally supported operating element, and the abutment is adjustable relative to the guide rail by a rotation of the operating element, and wherein the operating element is rotationally supported about an axis extending substantially parallel to the longitudinal direction of the guide rail.

7. A guide system for guiding a door wing movably supported relative to a furniture carcass, the guide system comprising:

a guide rail having a longitudinal direction to extend substantially parallel to a depth direction of the furniture carcass in a mounted condition on the furniture carcass, a carrier for movably supporting the door wing, the carrier being displaceably supported along the guide rail, an abutment configured to determine an end position of the carrier in the longitudinal direction of the guide rail, and an adjustment device for adjusting a position of the abutment along the longitudinal direction relative to the guide rail, wherein the adjustment device includes a rotationally supported operating element, and the abutment is adjustable relative to the guide rail by a rotation of the operating element, and wherein the guide system further comprises a transmission mechanism configured to convert a rotational movement of the operating element into a linear movement of the abutment.

8. The guide system according to claim 7, wherein the transmission mechanism includes a coupling rod connected to the abutment, the coupling rod being movable relative to the guide rail by an actuation of the adjustment device.

9. The guide system according to claim 8, wherein the guide rail includes a guide channel to receive the coupling rod, the guide channel extending in the longitudinal direction of the guide rail.

10. A guide system for guiding a door wing movably supported relative to a furniture carcass, the guide system comprising:

a guide rail having a longitudinal direction to extend substantially parallel to a depth direction of the furniture carcass in a mounted condition on the furniture carcass, a carrier for movably supporting the door wing, the carrier being displaceably supported along the guide rail, an abutment configured to determine an end position of the carrier in the longitudinal direction of the guide rail, and an adjustment device for adjusting a position of the abutment along the longitudinal direction relative to the guide rail, wherein the abutment is arranged on an ejector of an ejection device for ejecting the carrier in a direction opposite the depth direction by overpressing the abutment into an overpressing position located behind the end position.

11. The guide system according to claim 10, wherein the adjustment device is configured to adjust an entirety of the ejection device relative to the guide rail.

12. A guide system for guiding a door wing movably supported relative to a furniture carcass, the guide system comprising:

a guide rail having a longitudinal direction to extend substantially parallel to a depth direction of the furniture carcass in a mounted condition on the furniture carcass, a carrier for movably supporting the door wing, the carrier being displaceably supported along the guide rail, an abutment configured to determine an end position of the carrier in the longitudinal direction of the guide rail, an adjustment device for adjusting a position of the abutment along the longitudinal direction relative to the guide rail, and a longitudinal rail extending transversely to the guide rail in a mounted condition.

13. The guide system according to claim 12, wherein the longitudinal rail extends at a right angle to the guide rail in a mounted condition.

14. An item of furniture comprising:

a furniture carcass, a door wing movably supported relative to the furniture carcass, and a guide system for guiding the door wing movably supported relative to the furniture carcass, the guide system including:

a guide rail having a longitudinal direction to extend substantially parallel to a depth direction of the furniture carcass in a mounted condition on the furniture carcass, a carrier for movably supporting the door wing, the carrier being displaceably supported along the guide rail, an abutment configured to determine an end position of the carrier in the longitudinal direction of the guide rail, and an adjustment device for adjusting a position of the abutment along the longitudinal direction relative to the guide rail, wherein the guide rail is arranged on the furniture carcass and extends in a depth direction of the furniture carcass, the door wing being movably connected to the carrier and movably supported, jointly with the carrier, along the guide rail in the depth direction of the furniture carcass.

15. The item of furniture according to claim 14, further comprising a second door wing hingedly connected to the first door wing, the first door wing and the second door wing being movably supported between a first position, in which the first door wing and the second door wing are aligned substantially coplanar to one another, and a second position, in which the first door wing and the second door wing are aligned substantially parallel to one another, the first door wing and the second door wing, from the second position and jointly with the carrier, being movably supported along the guide rail in the depth direction of the furniture carcass.

* * * * *